United States Patent [19]
Yamazaki et al.

[11] Patent Number: 5,735,741
[45] Date of Patent: Apr. 7, 1998

[54] GAME MACHINE WITH CHAOTIC NUMBER GENERATOR

[75] Inventors: Shunpei Yamazaki, Tokyo; Akiharu Miyanaga; Toshiji Hamatani, both of Kanagawa, all of Japan

[73] Assignee: Semiconductor Energy Laboratory Co., Ltd., Kanagawa-ken, Japan

[21] Appl. No.: 443,181

[22] Filed: May 17, 1995

[51] Int. Cl.[6] .................................................. A63F 9/22
[52] U.S. Cl. ............................................................ 463/22
[58] Field of Search ................................ 463/16, 22, 25, 463/36; 364/717; 380/48, 46

[56] References Cited

U.S. PATENT DOCUMENTS 5,395,110  3/1995  Yamazaki et al. .................. 273/108

*Primary Examiner*—Jessica Harrison
*Assistant Examiner*—Michael O'Neill
*Attorney, Agent, or Firm*—Sixbey, Friedman, Leedom & Ferguson, PC; Gerald J. Ferguson, Jr.; Eric J. Robinson

[57] ABSTRACT

A game machine in which regularity of the game content provided by the game machine cannot be easily determined by a player. The game machine provides a game whose regularity cannot be easily determined by the player by using a chaotic random number which is generated by a chaos generating means.

5 Claims, 4 Drawing Sheets

GAME MACHINE WITH CHAOTIC NUMBER GENERATOR

TECHNICAL FIELD

The present invention relates to a game machine wherein a game content is changed on the basis of a chaotic random number which is generated by means for electronically generating chaotic random numbers.

BACKGROUND OF THE INVENTION

A game machine where game content is displayed on various image display devices, such as cathode ray tubes, liquid crystal display devices or the like, and is operated by a player are known in the prior art. These game machines are generally referred to as TV games.

As an example of game content in such game machines, there are games in which targets that appear on the screen are bombarded and shot down by a battery operated by a player. In these games, the target side also attacks the battery of the player and storms into the battery of the player, thereby often complicating the game content. In such a case, the way the target moves and the assault patterns on the screen are changed in accordance with the game content, and furthermore how the movement and the patterns are controlled constitute an important factor that makes the game content very interesting.

Generally, by complicating the game content in accordance with a predetermined program or by complicating the game content as the game advances, the aforementioned game machines are designed so that the player will not get tired of the game. However, when the game is repeated several times or several tens of times, the player usually gets tired of the game. On the other hand, when the game is too complicated, the game is not interesting at all from the very beginning.

Such a game machine typically comprises a CPU controlling mechanism so that the complicated game content is controlled by the CPU control mechanism. In other words, the game content of these game machines is controlled with a CPU, or a so-called microprocessor or computer.

The role of such a computer is to perform various kinds of calculations on the basis of both information stored in a memory in advance and information obtained from the game content of a game played by the player in accordance with a predetermined procedure (program) to provide a specific operation instruction to various kinds of controlling devices based on the result of the calculation. The features controlled by these controlling devices includes the game content displayed on the screen, sound effects and music corresponding to the game content, various kinds of information designated by sound, and various kinds of stimulus to the player (for example, rocking and tilting chairs).

However, these game machines include electrical components only to ease the implementation of the game machine, and the player only has to wait for a response by the computer. The aforementioned game machines that include electrical components use the latest electronic technology with the result that the game content becomes remarkably rich in variations in comparison with prior art game machines.

However, when a player plays a game with such a game machine, they come to detect how the game machine responds to a specific situation at the time of a specific operation so that the player feels that the game content advances in a specific pattern. This is due to the fact that the response of the game machine becomes uniform in accordance with a predetermined procedure or program, and since means for generating random numbers used by the computer are incorrect so that the regularity becomes immediately apparent to the player.

Since the player is a human, he/she soon learns how the machine will respond, or the regularity of the random numbers with the result that the player will soon lose interest in the game. Under these circumstances, the supplier tries to deal with this problem by changing the settings of the game, and supplying the market with the game shifts based on new rules.

To overcome the aforementioned defects, the game machine may be basically provided with a calculation processing means which is capable of generating a correct random number. For example, the line coordination method and the M-series or the like are well known methods for generating a correct random number. However, in the game machine in which an inexpensive and simple CPU needs to be used as compared with one used in the general-purpose computers, it is difficult to generate correct random numbers in a cost effective manner.

Therefore, a method for easily generating a correct random number which can be used in a normal CPU, and being rich in variations is desired. Furthermore, it is desired to provide a game machine which prevents the game player from easily detecting the regularity of the game content.

SUMMARY OF THE INVENTION

The present invention disclosed in this specification is intended to provide a game machine which has means for generating a better quality random number and has a game content whose regularity is not readily detected by the player.

One object of the present invention is characterized by providing a game whose regularity cannot be easily detected by the player by using a chaotic random number generated by a random number generating means.

Another object of the structure of the present invention is characterized by at least comprising a detecting means for detecting a game content, a random number generating means for generating a chaotic random number, and a means for designating at least part of a specific game content.

Another object of the structure of the present invention is characterized by at least comprising a display part, a random number generating means for generating a chaotic random number and a processing portion for instructing the control of the display of the aforementioned display part.

Another object of the structure of the present invention is characterized by using a numeric value obtained by solving a non-linear difference equation as one condition for determining a change in a game content. The aforementioned structure is characterized by containing a change in the regularity of the solution obtained from the aforementioned equation by changing the variable of the non-linear equation.

DETAILED DESCRIPTION OF THE PREFERRED EMBODIMENT

Figure 1:
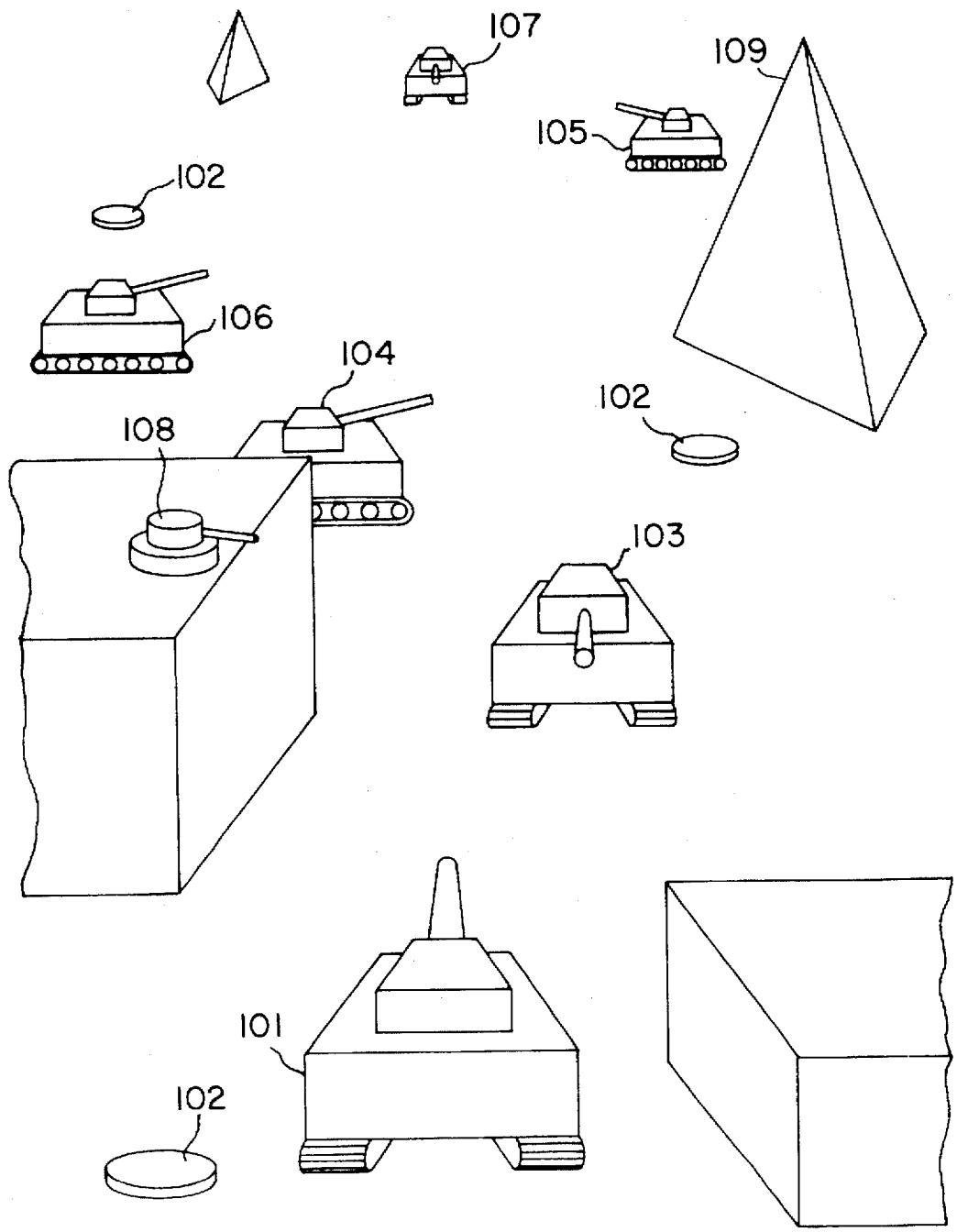
FIG. 1 illustrates one example of the game content that is displayed on a display device of a game machine in accordance with a first preferred embodiment of the present invention.

First, an explanation will be given as to what chaos means. In both the world of nature and the artificial world, there are many phenomena that can be predicted. For example, it is possible to predict and respond to the position of both Halley's comet and artificial satellites as well. The deterministic predictability in which cause and effect is clear seems to be one of the great capabilities of science.

However, although weather forecasting can be regarded as the prediction of air movement that follows physical rules, it often turns out to be incorrect. It is said that the phenomena in which cause and effect is unclear is assumed to incorporate imprecise, or rough, elements. It has been basically thought that when complete parameters for describing a system are clear, an accurate prediction can be made. In other words, it has been thought that when it is possible to sufficiently collect information on a system, an accurate prediction can be made.

Specifically, it has been thought that imprecision is generated because of insufficient information with respect to multiple degrees of freedom in the system. Although, it has been found that there are deterministic existences whose essential character is imprecise as a result of discovery that even a simple system having a few degrees of freedom (three dimensions or less) exhibits a rough behavior. Such imprecision has come to be referred to as chaos.

However, the concept of chaos is not still unified. Like the theory of evolution, the definition of the concept of chaos extends over such a wide range that the concept of chaos seems to have its own meaning in some fields. In this specification, chaos is defined as follows: Chaos means a phenomenon of a substantially random state resulting from a very complicated behavior appearing as a non-linear type, even if the system has a decision theoretic regularity. Thus, chaos defined in such a manner refers to a phenomenon that seems to be in disorder without any regularity and predictability but that has complicated order and rules.

Such an idea of chaos can be mathematically applied to solve a specific non-linear equation with the result that extremely high quality random numbers can be generated. In other words, it sometimes happens that a function represented by a simple equation produces a result that is so complicated that regularity cannot be found. By using such a principle, very high-quality random numbers can be obtained.

As an equation for generating such random numbers, a one-dimensional non-linear difference equation (Equation 1) described hereinbelow can be given which is represented by a mapping (r) from one section to another:

$$X_{n+1}=r(X_n), n=0, 1,$$ (1)

A solution obtained from the aforementioned equation sometimes includes an irregular and imprecise solution which is referred to as chaos. A simple example of such non-linear mapping are the Bernouilli's shift, a logistic mapping, a tent mapping, the Chebyshev's mapping or the like. For example, the Bernouilli's shift refers to a shift which is represented by Equation 2:

$$r(X_n) = \begin{cases} 2X_n, 0 \leq X_n \leq 1/2 \\ 2X_n - 1, 1/2 \leq X_n \leq 1 \end{cases}$$ (2)

Further, the logistic mapping refers to a mapping which is represented by an Equation 3:

$$r(X_n)=bX_n(1-X_n)$$ (3)

Particularly, when the value of b is given as b=4.0 in the Equation 3, the case is referred to as "pure chaos." Further, the tent mapping refers to a mapping represented by an Equation 4:

$$r(X_n) = \begin{cases} X_n/\theta, 0 \leq X_n \leq \theta \\ (1-X_n)/(1-\theta), \theta \leq X_n \leq 1 \end{cases}$$ (4)

The Chebyshev mapping refers to a mapping which is represented by an Equation 5;

$$r(X_n)=\cos(n \cos^{-1} X_n)$$ (5)

Each of the solutions to these equations is a chaotic random number, and the regularity of this random number is not generally made clear. Furthermore, it is possible to generate the chaotic random number in addition to these aforementioned mappings.

For example, in the logistic mapping shown in Equation 3, the obtained solution is changed when the variable b in the equation is changed. As the value b comes close to 4, the obtained solution will be given in the range of 0.0 to 1.0 which is more close to a chaotic random number. On the contrary, when this variable is changed, a limit can be placed on the number of obtained solutions. For example, in the case where b has a value of 2, the solution which is obtained converges to one solution. When the symbol b represents a value in the vicinity of 3.5, the solution converges to 4 solutions. Further, as the symbol b comes close to 4, this limit becomes greater, and the solution will become a chaotic random number within a definite range.

Figure 3:
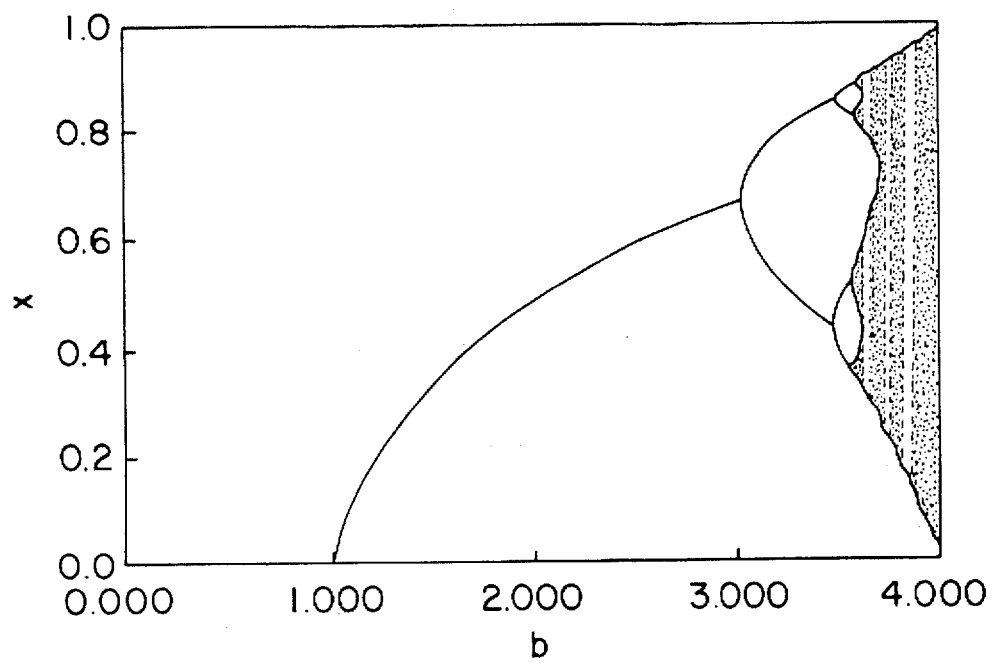
FIG. 3 illustrates a variable dependency of a solution of a logistic mapping in accordance with the present invention.

The state of the random number is shown in FIG. 3. FIG. 3 is a view of a logistic mapping represented by Equation 3. In FIG. 3, a solution distribution is shown. It is obtained in the range of n=300 and n=500 at the time of calculating n up to n=500 when the initial value Xo is set to 0.3 and the variable b is changed from 0 to 4. The vertical axis value which corresponds to the position of a black point in FIG. 3 is a value of solution. As described above, when b is a value which is smaller than a value in the vicinity of 3, the solution converges to one value. When b is a value in the vicinity of 3.1 to 3.4, the solution converges to 2 values. Further, when b becomes even larger than the aforementioned values, the solution will have an even larger number of values such as 4 and 8 values. Thus, the numbers of values will gradually assume a larger value and the solution will become a chaotic random number.

However, for example, it sometimes happens that the solution will be 0.5 after a certain number of repetitions depending on the number of effective digits taken at the time of the calculation process. In such a case, the solution after that will always be 0.5. Consequently, it is necessary to pay attention to the number of effective digits taken at the time of the calculation operation, and the range of repetition in which the solution is used.

A chaotic random number generated by such method is used in a game machine. This game machine comprises at least a random number generating portion for generating the aforementioned chaotic numbers, a processing portion for giving various instructions depending on the random number which is generated by the random number generating portion, and various kinds of controlling devices for changing the response of the game on the basis of the instructions given by the processing portion whereby the game content does not easily become clear to the player.

As described above, since a limit can be placed on the number of solutions by changing the variable b of the equation, the generation of random numbers can be controlled through use of this limit. In other words, variable b can be set as part of the game condition to obtain a solution of the aforementioned equation so that the game content is changed by the solution depending on the condition. As a result, when the game content is changed according to the solution, the game content at the time of a specific value of the variable b and at a different time having a different value of the variable b are different so that a more complicated game can be realized.

Furthermore, it is possible to cease to represent the solution obtained by solving the equation as a random number. That is, the variable b can be changed to a specific value to realize a situation favorable for the beginning player. In other words, a situation is realized in which a specific value can be produced for the solution to the equation with the result that game content favorable for the player can be set with this value. By doing so, the degree of difficulty of the game can be appropriately changed.

Figure 2:
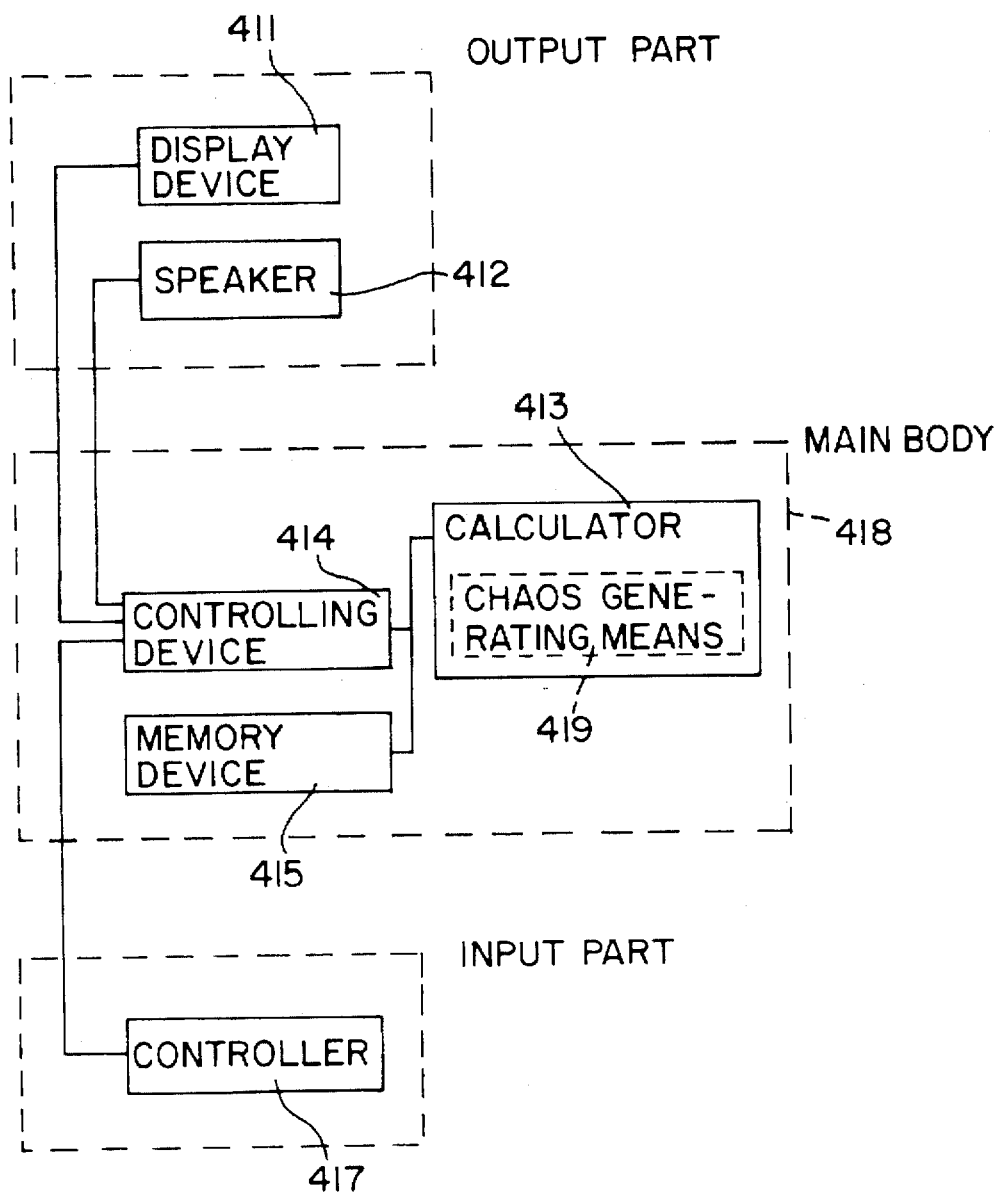
FIG. 2 illustrates a block diagram of the game machine in accordance with a first preferred embodiment of the present invention.
Figure 4:
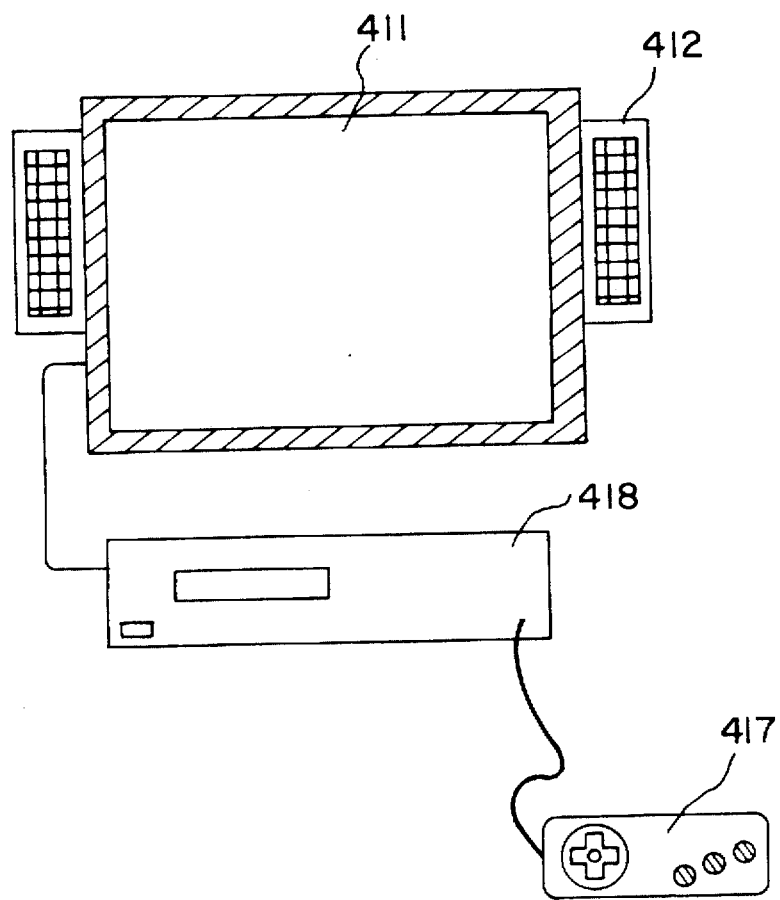
FIG. 4 illustrates a system block diagram of the game machine shown in accordance with a first preferred embodiment of the present invention.

Embodiment 1 of the present invention is related to a game machine of a type that is generally referred to as a shooting game. FIG. 2 is a block diagram showing a structure of the game machine. FIG. 4 is a system block diagram showing a schematic structure thereof. Reference numeral 418 denotes a main body of the game machine which incorporates various kinds of processing portions and a controller. The controlling device 414 functions to send information necessary for the processing portion 413, which comprises various kinds of integrated circuits, to receive a control signal from the processing portion and to control a display device 411 and a speaker 412. In addition, a memory device 415 incorporates necessary information. The display device 411 comprises a large-size cathode ray tube or a liquid crystal display device.

The game machine shown in FIGS. 2 and 4 performs calculations necessary for the processing portion 413 on the basis of an input (which is performed by the player) from a controller 417 of the input portion. The controlling device 414 controls the display device 411 as a result of the calculation to display the game content on the display device 411. Furthermore, sound effects and necessary information are output from the speaker 412. The speaker 412 is also controlled by the control circuit 414 on the basis of the instructions from the processing portion 413.

The processing portion 413 incorporates a chaos generating means 419 which generates a random number for controlling the game content. The chaos generating means can be comprised of an inexpensive integrated circuit.

FIG. 1 shows an example of the game content displayed on the display device 411. Of course, the game content can be changed into various contents by changing the game software. FIG. 1 shows a basic content of the game in which a battle tank denoted by reference numeral 101 is operated by a player to destroy battle tanks on the opponent side denoted by reference numerals 103 to 107. In the game content as shown in FIG. 1, since the opponent tanks 103 to 107 attack the tank 101 operated by the player, the player must proceed with the game by avoiding the attacks from the opponent. In addition to the opponent tanks, a battery 108 attacks the tank 101. Also, the tank 101 must be moved by avoiding an obstacle denoted by reference numeral 109. Furthermore, reference numeral 102 denotes a mine. When the tank 101 treads on the mine, the tank 101 is damaged.

In such a structure, how the opponent tanks 103 to 107 move and what kind of attack they will make constitute a very important factor of the game content. Furthermore, how the battery 108 attacks is also a very important matter.

In this embodiment, information on the movement and attack of the tank 101 operated by the player is converted into an electric signal and is sent to the processing portion 413 of the main body 418 of the game machine. The processing portion 413 determines the movement and the attack of the tanks 103 to 107, and further the attack of the battery 108 while dodging the attack from the tank 101. At this time, in the processing portion 413, the movement and attack of the tanks 103 to 107 and the attack of the battery 108 are determined in accordance with the chaotic random number which is generated by the chaotic random number generating means 419.

As a result, the movement and the attack of the tanks 103 to 107 and further the attack of the battery 108 do not become monotonous, and cannot be predicted by the player. The game content can be further complicated by appropriately changing the chaotic random number. Furthermore, it is also possible to prevent the player from feeling that the game is too difficult and losing interest in the game.

In this embodiment, a solution of the following Equation 6 which uses a logistic mapping, for example, with respect to the non-linear difference equation is used as a chaotic random number;

$$X_{n+1}=4X_n(1-X_n)$$

For example, when n is set as n=301, 302, 303, 304 and 305, examples of a solution to this expression include "0.8721," "0.4462," "0.9884," "0.0458" and "0.1747." The initial value in this case is set to 0.1 and the variable is set to 4.0000.

By using the present invention disclosed in this specification, a game machine having a regularity of game content that cannot be easily detected can be provided. Furthermore, the game can be implemented by an inexpensive machine. Also, a value required for the game can be obtained by solving a relatively simple non-linear equation, and the solution can be obtained by changing a variable in the equation from a chaotic random number to a two value or one value solution. Consequently, various values can be simply obtained in accordance with the game content. This means that the values can have wider width depending on the game content.

We claim:

1. A game machine comprising random number generating means for generating a chaotic random number and control means for using said chaotic random number generated by said random number generating means to control operation of the game machine to prevent a player from easily detecting a regularity of the game.

2. The game machine of claim 1 wherein said random number generating means includes means for solving a non-linear difference equation.

3. The game machine of claim 2 wherein the regularity in a solution obtained from said non-linear difference equation is varied by changing variables in the non-linear difference equation.

4. A game machine comprising detecting means for detecting a game content, a random number generating means for generating a chaotic random number and processing means for controlling the game content.

5. A game machine comprising a display portion, a chaotic random number generating means for generating a chaotic random number, and control means for controlling a display on said display portion.

\* \* \* \* \*